United States Patent
Seki et al.

(10) Patent No.: US 9,210,301 B2
(45) Date of Patent: Dec. 8, 2015

(54) GENERATION INTERPOLATION FRAMES

(75) Inventors: Yukinaga Seki, Kyoto (JP); Hidetoshi Takeda, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 747 days.

(21) Appl. No.: 13/543,406

(22) Filed: Jul. 6, 2012

(65) Prior Publication Data

US 2012/0281076 A1 Nov. 8, 2012

Related U.S. Application Data

(63) Continuation of application No. PCT/JP2011/004932, filed on Sep. 2, 2011.

(30) Foreign Application Priority Data

Mar. 3, 2011 (JP) ................................. 2011-046677

(51) Int. Cl.
*H04N 13/00* (2006.01)
*H04N 7/01* (2006.01)
*H04N 5/14* (2006.01)
(Continued)

(52) U.S. Cl.
CPC .............. *H04N 5/144* (2013.01); *H04N 7/0132* (2013.01); *H04N 13/0011* (2013.01); *H04N 19/587* (2014.11); *H04N 19/597* (2014.11); *H04N 2013/0085* (2013.01)

(58) Field of Classification Search
CPC .......... H04N 13/0497; H04N 13/0404; H04N 13/0409; H04N 13/0422; G02B 27/2214
USPC ....................................................... 348/51, 42
See application file for complete search history.

(56) References Cited

U.S. PATENT DOCUMENTS

| 5,682,437 | A | 10/1997 | Okino et al. |
| 2008/0231745 | A1* | 9/2008 | Ogino et al. .................. 348/441 |
| 2009/0059067 | A1* | 3/2009 | Takanohashi et al. ........ 348/452 |

(Continued)

FOREIGN PATENT DOCUMENTS

| JP | 08-098211 A | 4/1996 |
| JP | 08-149513 A | 6/1996 |

(Continued)

OTHER PUBLICATIONS

International Search Report issued in International Patent Application No. PCT/JP2011/004932, filed Sep. 2, 2011.

*Primary Examiner* — Sath V Perungavoor
*Assistant Examiner* — Howard D Brown, Jr.
(74) *Attorney, Agent, or Firm* — McDermott Will & Emery LLP

(57) ABSTRACT

The instant application describes a stereoscopic video processing system that includes a vector detector configured to detect a motion vector associated with frames of an input video signal; an output image generator configured to generate interpolation frames based on the frames of the input video signal and the motion vector and to arrange the frames of the input video signal and the interpolation frame along a time axis; and an output controller configured to control the output image generator to output the interpolation frames as the output video signal alternately at intervals of one frame and two frames, and output the frames of the input video signal between the one frame and the two frames of the interpolation frames.

7 Claims, 11 Drawing Sheets

(51) Int. Cl.
*H04N 19/597* (2014.01)
*H04N 19/587* (2014.01)

(56) References Cited

U.S. PATENT DOCUMENTS

| | | | |
|---|---|---|---|
| 2010/0053429 A1* | 3/2010 | Miyazaki et al. | 348/513 |
| 2010/0245547 A1* | 9/2010 | Tanaka | 348/51 |
| 2010/0289873 A1* | 11/2010 | Miyauchi et al. | 348/43 |
| 2010/0328529 A1* | 12/2010 | Hirayama et al. | 348/452 |
| 2011/0285816 A1* | 11/2011 | Miyazaki et al. | 348/43 |
| 2012/0281076 A1* | 11/2012 | Seki et al. | 348/51 |

FOREIGN PATENT DOCUMENTS

| | | |
|---|---|---|
| JP | 09-172618 | 6/1997 |
| JP | 2005-260810 | 9/2005 |
| WO | WO 2011/099267 A1 | 8/2011 |

* cited by examiner

US 9,210,301 B2

GENERATION INTERPOLATION FRAMES

CROSS-REFERENCE TO RELATED APPLICATIONS

This application is a continuation of PCT International Application PCT/JP2011/004932 filed on Sep. 2, 2011, which claims priority to Japanese Patent Application Number 2011-046677 filed on Mar. 3, 2011. The disclosures of these applications including the specifications, the drawings, and the claims are hereby incorporated herein by reference in their entirety.

TECHNICAL FIELD

The present disclosure relates to a stereoscopic video processing system configured to detect motion vectors between right and left image frames of stereoscopic video signals and generate interpolation frames using the detected motion vectors, and more particularly to a stereoscopic video processing system configured to convert three-dimensional movies filmed at a frame frequency of 24 Hz to stereoscopic video images of 60 Hz and perform frame sequential display at 120 Hz.

BACKGROUND

In recent years, 3D movies of a binocular disparity type have been rapidly spread, which provide right and left eyes of viewers with different images so that the viewers recognize the three-dimensional effect. Showing 3D movies at theaters and watching 3D movies at home with 3D enabled devices are becoming common.

The 3D enabled devices for watching 3D movies at home usually employ liquid crystal shutter glasses. With the liquid crystal shutter glasses, right and left images are alternately displayed on a display (i.e., frame sequential display). A viewer wears the liquid crystal shutter glasses, which shut images coming into the right or left eye in synchronization with the display of an image. This allows the viewer to recognize the right image with the right eye, and the left image with the left eye. As a result, the viewer perceives the three-dimensional effect created by the binocular disparity between the right and left images.

In general, while movies are filmed at a frame frequency of 24 Hz, they are displayed at a frame frequency of 60 Hz under the NTSC system on home television sets. When a two-dimensional video image of 24 Hz is converted to a video image of 60 Hz, frame frequency conversion (i.e., telecine conversion) by 3:2 pull-down may be performed. In the 3:2 pull-down, a single frame of 24 Hz may be alternately displayed as three frames and two frames of 60 Hz.

FIG. 7 illustrates an example where a ball crossing a screen is filmed at 24 Hz and displayed at 60 Hz after performing 3:2 pull-down. As shown, in 3:2 pull-down, the first frame of 24 Hz is displayed as three frames, the second frame of 24 Hz is displayed as two frames, and the third frame of 24 Hz is displayed as three frames. When a human views something moving uniformly like in this example, it is known that the line of sight moves so as to follow the motion.

FIG. 8 illustrates the relationship between time and the display position of the ball shown in FIG. 7. As shown in FIG. 8, the line of sight follows the displayed ball and moves along the track of the line of sight indicated by the arrow. In the graph, while the position of the ball coincides with the track of the line of sight on frames 2 and 7, the position of the ball does not coincide with the track of the line of sight on the other frames. For example, the ball appears behind the track of the line of sight on frames 1, 4, and 6, and appears in front of the track of line of sight on frames 3, 5, and 8. As such, the uniformly moving ball seems to blur back and forth. This state is called a film judder, which can largely influence the image quality in a stereoscopic video image. An example will be described where the right and left images of the scene of FIG. 7 are filmed in 3D at 24 Hz.

FIG. 9 illustrates the relationship between time and the display position of the ball where a stereoscopic video image of 24 Hz is converted to right and left video images of 60 Hz by 3:2 pull-down and displayed by frame sequential display at 120 Hz.

FIG. 10 illustrates deviation of the display position of the ball from the centers of the lines of sight from the right and left eyes and the binocular disparity caused by the deviation. As shown, when a stereoscopic video image of 24 Hz is converted to a stereoscopic video image of 60 Hz by 3:2 pull-down and displayed by frame sequential display at 120 Hz, the degree of the binocular disparity of an output image non-uniformly fluctuates in a range between $N-\frac{2}{5}V$ and $N+\frac{3}{5}V$, where a degree of the binocular disparity between the right and left images of an input image is N, and the movement amount of the input image between frames is V.

With respect to a stereoscopic video image of the binocular disparity type, a viewer recognizes the three-dimensional effect based on the degree of the binocular disparity. If the degree of the binocular disparity non-uniformly fluctuates between the frames due to film judder as shown in FIG. 10, the viewer cannot precisely recognize the three-dimensional effect. In addition, the viewer is forced to three-dimensionally see a hard-to-see image, which could cause eyestrain.

Accordingly, there is a need for a stereoscopic video processing system, which can reduce such deterioration in the image quality caused by 3:2 pull-down.

SUMMARY

In one general aspect, the instant application describes a stereoscopic video processing system that includes a vector detector configured to detect a motion vector associated with frames of an input video signal; an output image generator configured to generate an output video signal by generating interpolation frames based on the frames of the input video signal and the motion vector, and arranging the frames of the input video signal and the interpolation frame along a time axis; and an output controller configured to control the output image generator to output the interpolation frames as the output video signal alternately at intervals of one frame and two frames and output the frames of the input video signal as the output video signal between the one frame and the two frames of the interpolation frames.

The above general aspect includes one or more of the following features. The output image generator may be configured to generate each of the interpolation frames in a phase dividing two of the frames of the input video signal into a ratio of 1:4. The stereoscopic video processing system may include a right frame frequency converter for processing a right input video signal and a left frame frequency converter for processing a left input video signal. The right frequency converter may include the vector detector, the output image generator, and the output controller. The left frequency converter may include the vector detector, the output image generator, and the output controller.

The stereoscopic video processing system may time-share a single frame frequency converter including the vector detector, the output image generator, and the output controller to process a right input video signal and a left input video signal. The vector detector may be configured to detect a motion vector of each block on each of the frames of the input video signal.

In another general aspect, the instant application describes a stereoscopic video display system that includes an input image selector configured to receive a stereoscopic video signal, and output a right input video signal and a left input video signal, each having a frame frequency of 24 Hz. The stereoscopic video display system also includes the above-described stereoscopic video processing system to process the right and left input video signals; and a display configured to perform frame sequential display of a right output video signal and a left output video signal, each having a frame frequency of 60 Hz, output from the stereoscopic video processing system.

In another general aspect, the instant application describes a stereoscopic video processing method that includes steps of: detecting a motion vector associated with frames of an input video signal; generating interpolation frames based on the frames of the input video signal and the motion vector; and outputting the interpolation frames as an output video signal alternately at intervals of one frame and two frames, and outputting the frames of the input video as the output video signal between the one frame and the two frames of the interpolation frames.

BRIEF DESCRIPTION OF THE DRAWINGS

The figures depict one or more implementations in accord with the present teachings, by way of example only, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without exemplary details. In other instances, well known methods, procedures, components, and circuitry have been described at a relatively high-level, without detail, in order to avoid unnecessarily obscuring aspects of the present concepts.

In exchange for the present disclosure herein, the Applicants desire all patent rights described in the claims. Therefore, the patent rights are not intended to be limited or restricted by the following detailed description and accompanying figures.

The instant application describes a stereoscopic video processing system configured to perform frame frequency conversion suitable for stereoscopic video images. In the stereoscopic video processing system of the instant application, when a stereoscopic video image of 24 Hz is converted to a stereoscopic video image of 60 Hz, interpolation frames are generated using a motion vector detected on part of frames, which largely influence the binocular disparity between the right and left images.

Usually, the motion vectors are detected from a two-dimensional video image of 24 Hz, and interpolation frames synchronizing with the display timing of an image of 60 Hz are generated using the motion vectors and displayed, thereby enabling display of smooth motion without unnaturalness. See, e.g., Japanese Patent Publication Number H09-172618. Such frame frequency conversion is called film dejudder.

Figure 7:
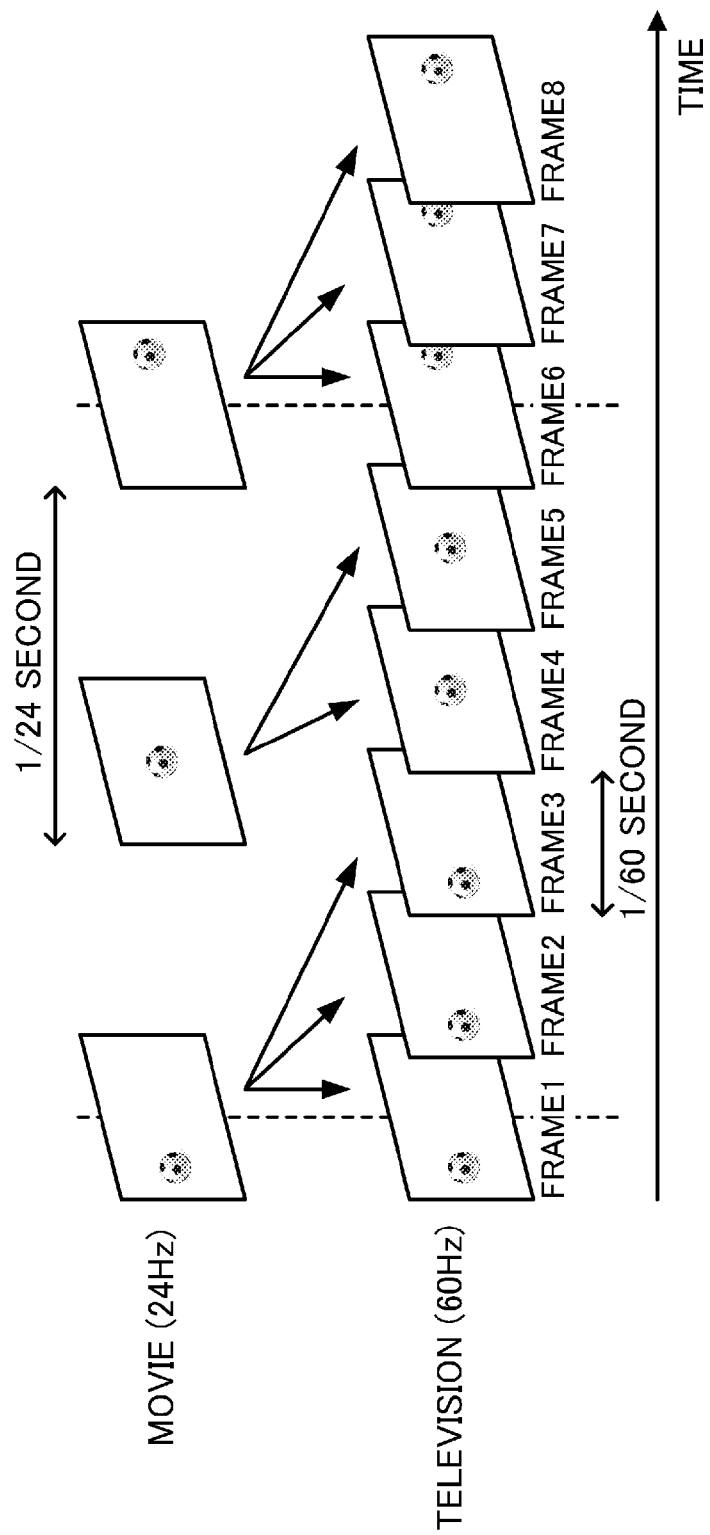
FIG. 7 illustrates an example where a ball crossing a screen is filmed at 24 Hz and displayed at 60 Hz after performing 3:2 pull-down.
Figure 8:
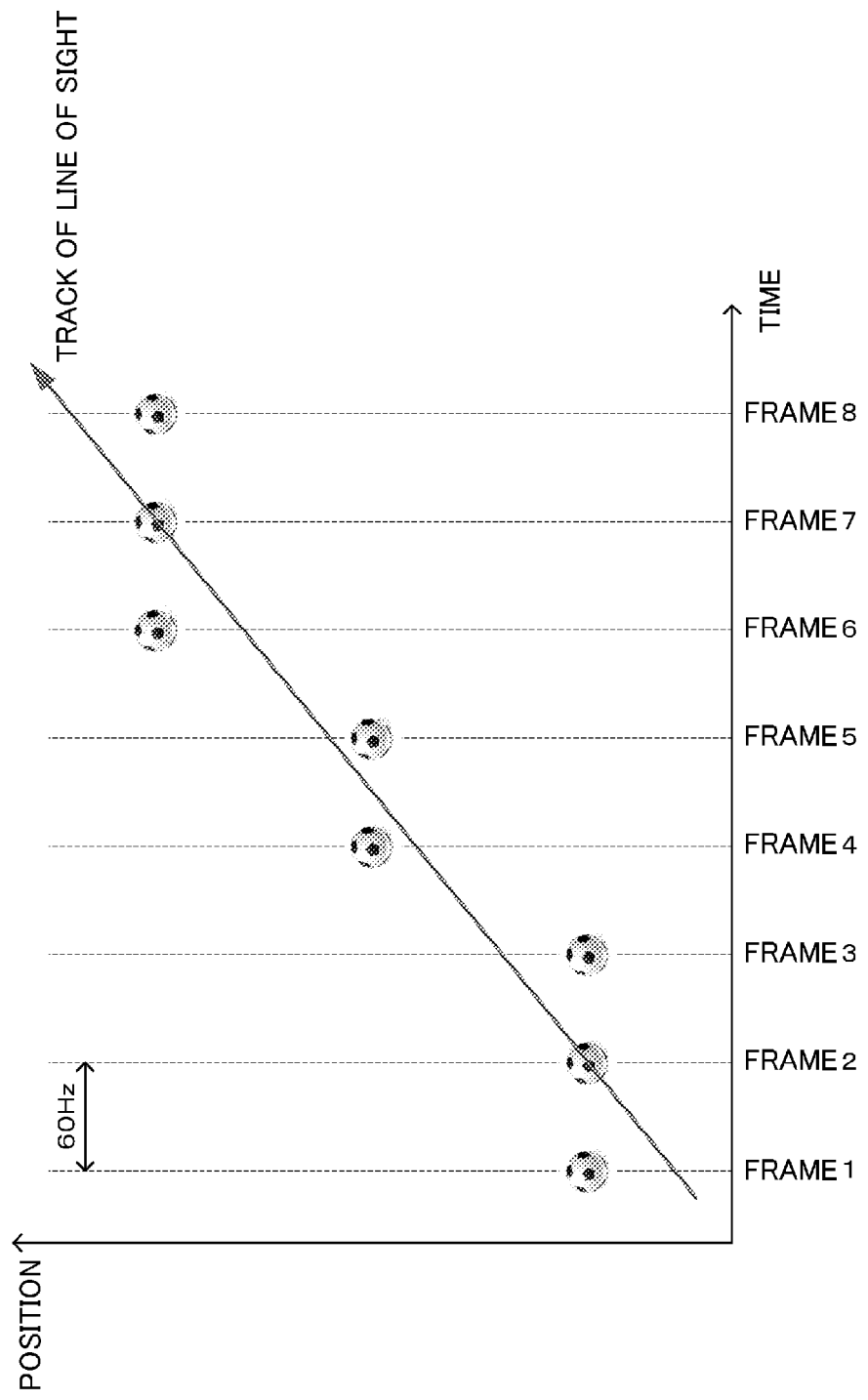
FIG. 8 illustrates the relationship between time and the display position of the ball shown in FIG. 7.
Figure 9:
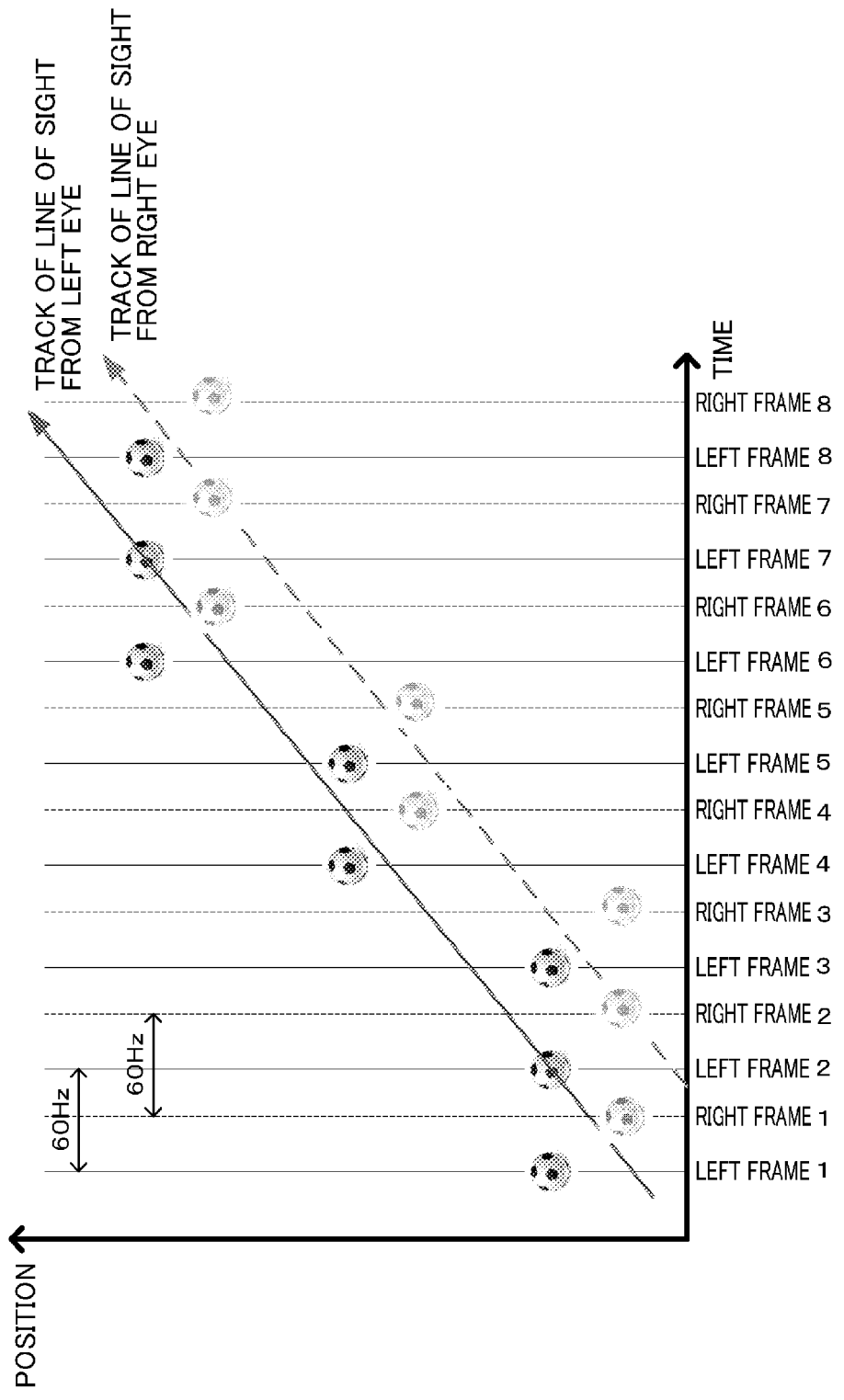
FIG. 9 illustrates an appearance of a stereoscopic video image created by 3:2 pull-down.
Figure 11:
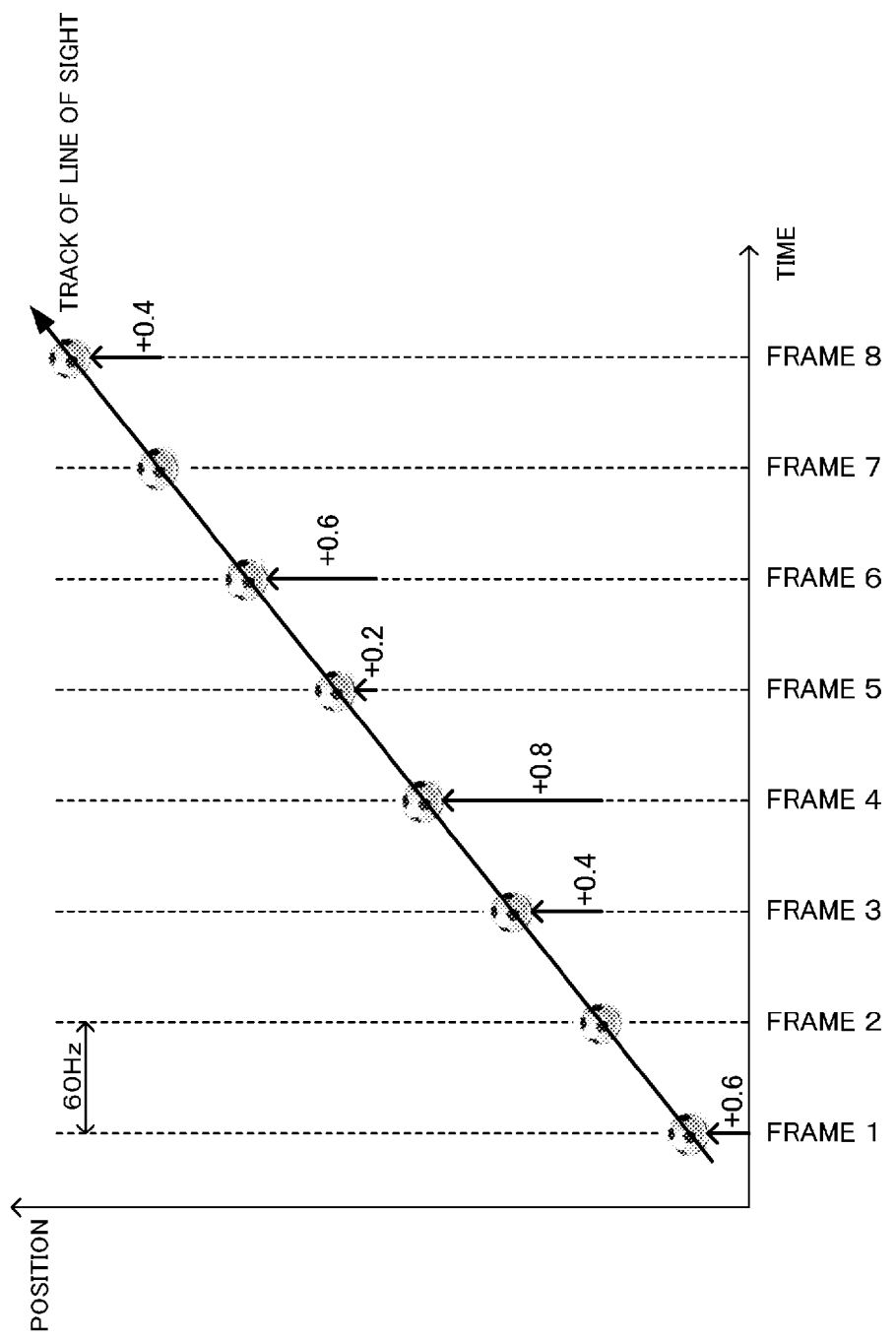
FIG. 11 illustrates the relationship between the time and the display position of the ball where the scene of FIG. 7 is subject to a film dejudder.

FIG. 11 illustrates the relationship between the time and the display position of the ball where the scene of FIG. 7 is subject to a film dejudder. The film dejudder generates and displays interpolation frames having phases shifted from the original frames 3 and 4 of 24 Hz by +0.4 and +0.8 frames, respectively. The film dejudder also generates and displays interpolation frames having phases shifted from the original frames 5 and 6 of 24 Hz by +0.2 and +0.6 frames, respectively. With respect to the frames 2 and 7, the original frames of 24 Hz are displayed without change. As a result, the display position of the moving ball coincides with the track of the line of sight, and smooth motion free from film judder can be provided. In addition, in the case of a stereoscopic video image, the film dejudder generates an interpolation frame which allows a moving object to coincide with the track of the line of sight. This stabilizes the degree of the binocular disparity, and as a result, the viewer more easily obtains the three-dimensional effect.

Since a motion vector used in frame frequency conversion is detected by comparing continuous frames, the movement of an object may be accurately detected. However, movement such as rotation and scaling may not be accurately detected. In addition, a correct motion vector may not be detected in a region included in only one of the continuous frames such as a region hidden in the background of the moving object, the region appearing from the background, and deformation of the object. Moreover, a motion vector is usually detected by searching a predetermined range from the block to be detected. When motion out of the search range occurs, a correct motion vector may not be detected.

When a correct motion vector is not detected, it is known that noise called a halo occurs around the moving object on an interpolation frame and in a video image formed of continuous interpolation frames. Halos are caused by incorrect interpolation frames, and thus frequently occur where the ratio of interpolation frames to displayed frames is high or where interpolation frames are displayed for a long time. When a stereoscopic video image of 24 Hz is converted to a stereoscopic video image of 60 Hz and displayed, an interpolation error could hinder establishment of correspondence between the right and left images and the viewer may not three-dimensionally see the image or may suffer eyestrain.

The stereoscopic video processing system is configured to reduce or eliminate interpolation errors to allow the view to more easily experience three-dimensional image or less eyestrain. To this end, in the stereoscopic video processing system of the instant application, when a stereoscopic video image of 24 Hz is converted to a stereoscopic video image of 60 Hz, interpolation frames are generated using a motion vector detected on part of frames, which largely influence the binocular disparity between the right and left images.

Figure 1:
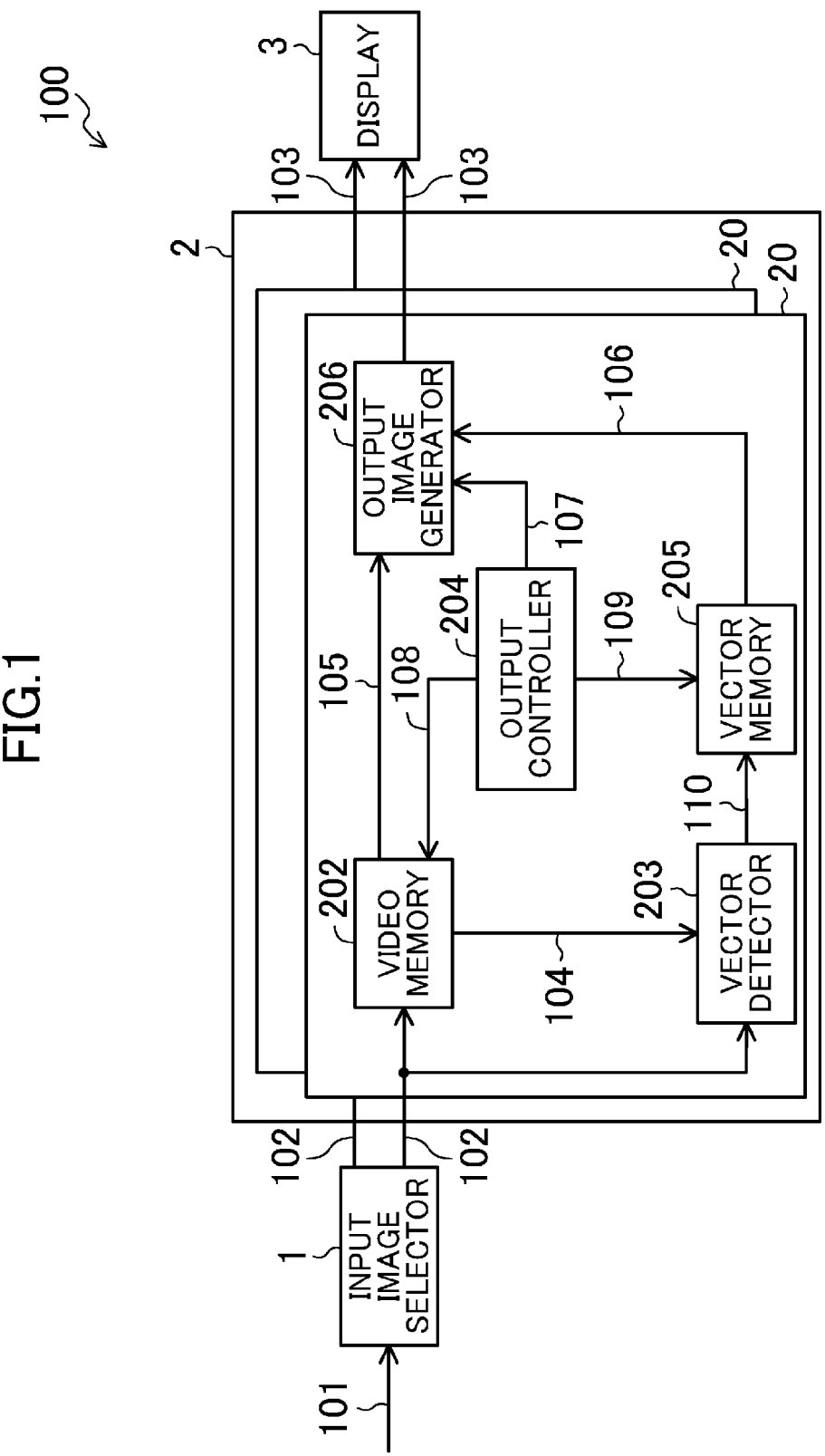
FIG. 1 illustrates an exemplary stereoscopic video display system of the instant application.

FIG. 1 illustrates an exemplary stereoscopic video display system 100 of the instant application. The stereoscopic video display system 100 includes an input image selector 1, a stereoscopic video processing system 2, and a display 3. The stereoscopic video processing system 2 includes right and left frame frequency converters 20, each of which includes a video memory 202, a vector detector 203, an output controller 204, a vector memory 205, and an output image generator 206.

The input image selector 1 divides an input stereoscopic video signal 101 into right and left input video signals 102 and outputs the signals 102 to the stereoscopic video processing system 2. The stereoscopic video signal 101 alternately includes right and left images of a frame frequency of 60 Hz. The stereoscopic video processing system 2 detects a motion vector between frames of each of the right and left input video signals 102, generates interpolation frames using the motion vector, and generates right and left output video signals 103. Specifically, the right frequency converter 20 detects a motion vector between frames of the right input video signal 102, generates interpolation frames using the motion vector, and generates the right output video signal 103. The left frequency converter 20 detects a motion vector between frames of the left input video signal 102, generates interpolation frames using the motion vector, and generates the left output video signal 103. The right and left output video signals 103 output from the stereoscopic video processing system 2 have a frame frequency of 60 Hz.

The display 3 receives the right and left output video signals 103 output from the stereoscopic video processing system 2 and performs frame sequencing by alternately displaying the right and left output video signals 103 at 120 Hz. The display 3 may be an LCD display, a PDP display, etc. and is not particularly limited, as long as it can display stereoscopic video signals. As described above, the stereoscopic video display system 100 displays in 3D at 120 Hz after performing frame frequency conversion of the input stereoscopic video signal 101 of 24 Hz.

Next, an example will be described where the input video signal 102 of 24 Hz is converted to the output video signal 103 of 60 Hz by frame frequency conversion (i.e., film dejudder) in each of the frame frequency converters 20.

The input image selector 1 outputs the input video signal 102 to the frequency converters 20. At the frequency converters 20, the input video signal 102 is received at the vector detector 203 and the video memory 202. The video memory 202 is a memory configured to store at least 3 frames of the input video signal and output preferred one of the stored frames to the output image generator 206. The video memory 202 is also configured to output one frame earlier than the present frame (e.g., the previous frame) to the vector detector 203. The vector detector 203 divides the input video signal 102 into blocks of, for example, 8×8 pixels, and detects the motion vector of each block by searching the position having the highest correlation with a previous frame video signal 104 which is input from the video memory 202.

Figure 2:
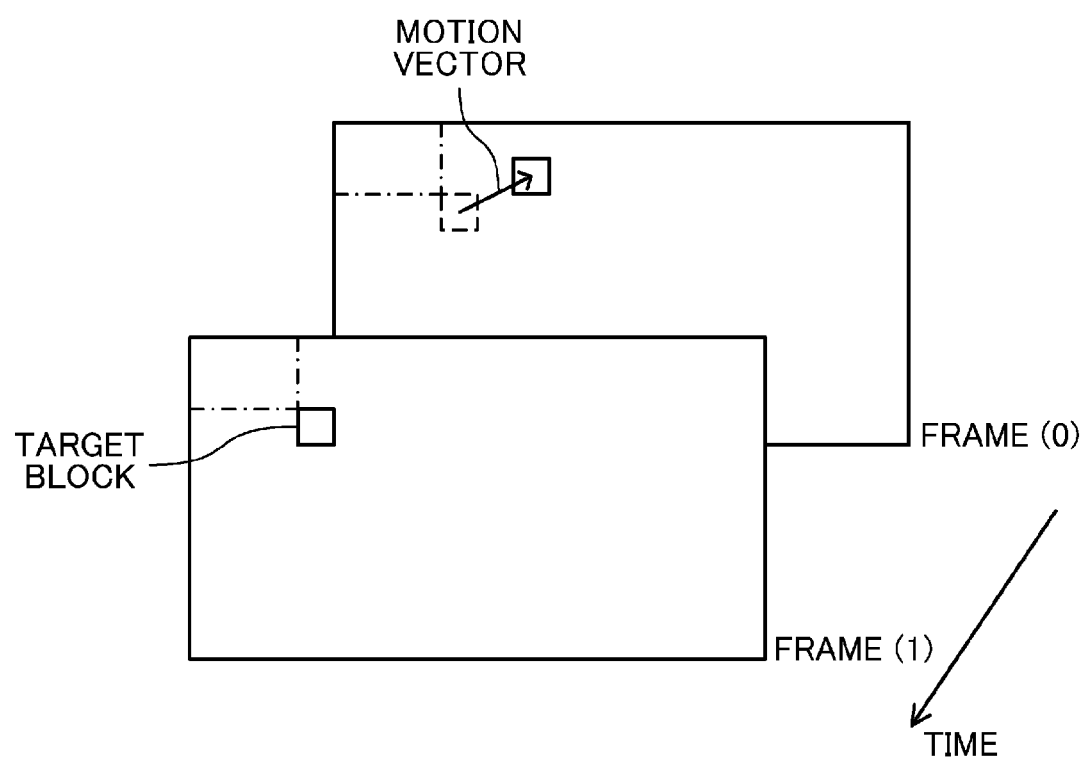
FIG. 2 illustrates an exemplary motion vector detected between two frames of the input signal.

FIG. 2 illustrates an exemplary motion vector detected between two frames of the input signal. As shown, for a target block selected on frame (1), the position having the highest correlation with the target block is searched on frame (0) which is one frame earlier, and the difference between the positions is detected as the motion vector. In one implementation, the search may be performed within the range of, for example, ±64 pixels horizontally and ±32 lines vertically from the block in which the motion vector is detected, and the position having the highest correlation in the range may be obtained. A correlation value may be the Sum of Absolute Differences (SAD), which is calculated by summing absolute differences in the entire block between the values of the pixels contained in the block and the respective values of the pixels contained in the block to be compared. The size of each block is not limited thereto, and may be greater or smaller. In addition, correlation values other than the SAD may be used. As a searching method, numbers of known techniques for reducing the processing amount and efficiently detecting motion vectors may be used.

Referring again to FIG. 1, the vector detector 203 outputs to the vector memory 205, a motion vector 110 detected from the input video signal 102, and the previous frame video signal 104. The vector memory 205 is a memory configured to store the motion vector 110 detected by the vector detector 203 and to absorb the time difference between writing by the vector detector 203 and reading by the output image generator 206, which will be described later. The vector memory 205 may have the capacity corresponding to the time difference. In one implementation, the vector memory 205 stores two motion vectors for two frames of the input video image. In another implementation, the vector memory 205 stores more than two motion vectors.

The output controller 204 determines which one of the motion vectors corresponding to two frames stored in the vector memory 205 is to be read, which two frames are to be read as the previous and next frames among a plurality of frames stored in the video memory 202 for generating an interpolation frame, and in which phase between the previous and next frames the interpolation frame is to be generated. Based on the result of these determinations, the output controller 204 outputs control signals. The control signals include an interpolation phase control signal 107, a frame selection signal 108, and a vector selection signal 109. Since the interpolation frames are generated at 60 Hz, which is also the frame frequency of the output video signal 103, the control signals from the output controller 204 are also output at a frequency of 60 Hz.

The video memory 202 receives from the output controller 204 the frame selection signal 108 for determining two frames to be used for interpolation and outputs to the output image generator 206, the two frames designated by the frame selection signal 108 as a previous and next frame video signal 105. The vector memory 205 receives from the output controller 204 the vector selection signal 109 for selecting the vector motion to be used for the interpolation and outputs the selected motion vector designated by the vector selection signal 109 as a motion vector 106 for interpolation to the output image generator 206. The specific operation of the output controller 204 will be described below with reference to FIG. 3.

Figure 3:
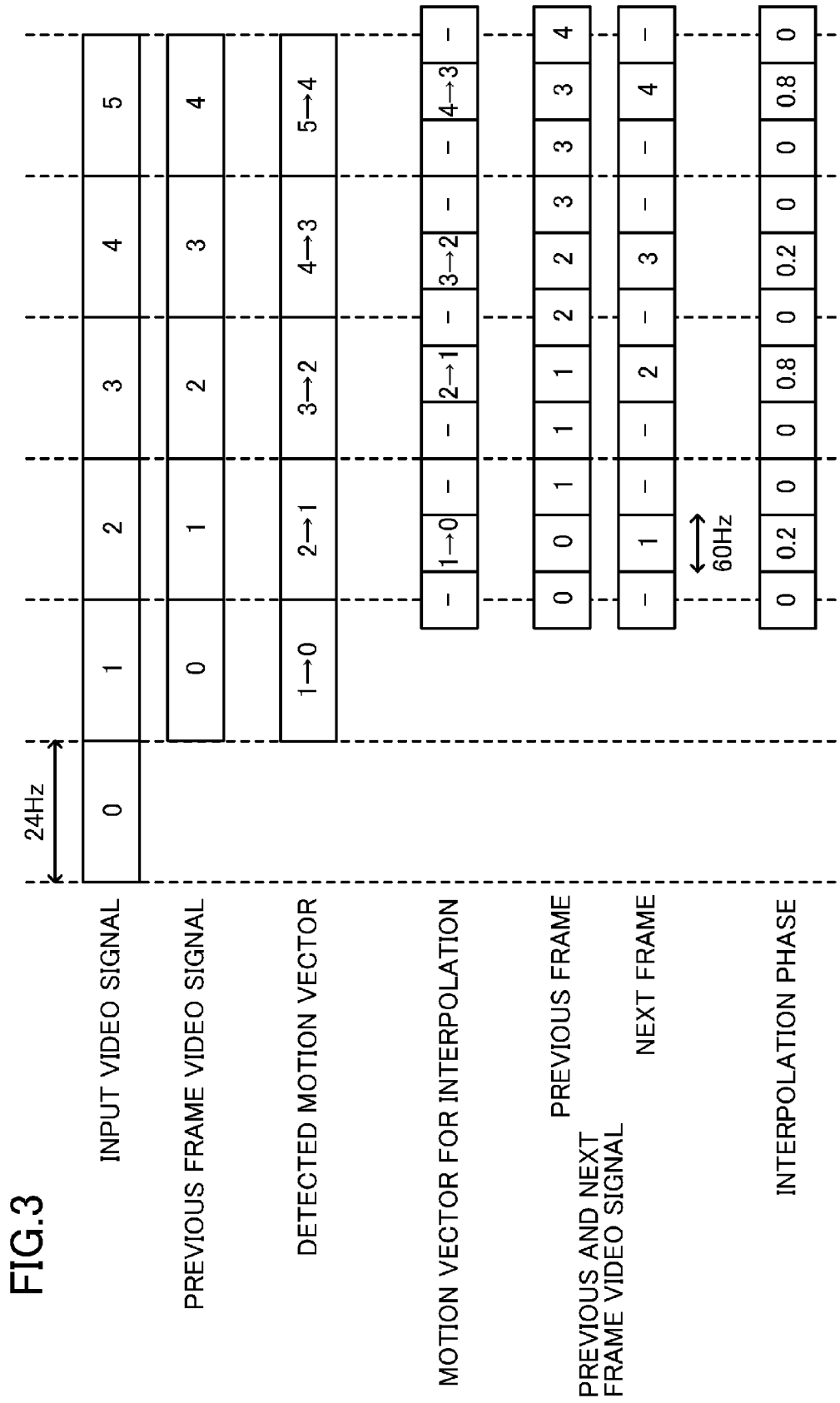
FIG. 3 illustrates an exemplary timing relationship between an input video signal, a previous frame video signal, a detected motion vector, a motion vector for interpolation, a previous and next frame video signal, and a interpolation phases.

FIG. 3 illustrates an exemplary timing relationship between the input video signal 102, the previous frame video signal 104, the detected motion vector 110, the motion vector 106 for interpolation, the previous and next frame video signal 105, and the interpolation phases 107. As shown, the output controller 204 outputs the frame selection signal 108, the vector selection signal 109, and an interpolation phase control signal 107 on the following five frames as one cycle:

1) The output controller 204 outputs the frame selection signal 108 to the video memory 202, instructing the video memory 202 to output frame (0) as the previous frame and no frame as the next frame in the previous and next frame video signal 105. The output controller 204 also outputs 0 as the interpolation phase control signal 107. At this time, since there is no need to generate an interpolation frame, no motion vector 106 for interpolation is required.

2) The output controller 204 outputs the frame selection signal 108 to the video memory 202, instructing the video memory 202 to output the frames (0) and (1) as the previous and next frame video signal 105. The output controller 204 also outputs as the vector selection signal 109, a signal for selecting the motion vector detected between the frames (1) and (0) as the motion vector 106 for interpolation. Additionally, the output controller 204 outputs 0.2 as the interpolation phase control signal 107.

3) The output controller 204 outputs the frame selection signal 108 to the video memory 202, instructing the video memory 202 to output the frame (1) as the previous frame and no frame as the next frame in the previous and next video signal 105. The output controller 204 also outputs 0 as the interpolation phase control signal 107. At this time, since there is no need to generate an interpolation frame, no motion vector 106 for interpolation is required.

4) The output controller 204 outputs the frame selection signal 108 to the video memory 202, instructing the video memory 202 to output the frame (1) as the previous frame and no frame as the next frame in the previous and next video signal 105. The output controller 204 also outputs 0 as the interpolation phase control signal 107. At this time, since there is no need to generate an interpolation frame, no motion vector 106 for interpolation is required.

5) The output controller 204 outputs the frame selection signal 108 to the video memory 202, instructing the video memory 202 to output the frames (1) and (2) as the previous and next frame video signal 105. The output controller 204 also outputs as the vector selection signal 109, a signal for selecting the motion vector detected between the frames (2) and (1) as the motion vector 106 for interpolation. Additionally, the output controller 204 outputs 0.8 as the interpolation phase control signal 107.

As a result, where the input video signal 102 includes frame (0), frame (1), frame (2), frame (3), frame (4) and frame (5), which are used as a reference; the output video signal 103 includes frame (0), frame (0.2), frame (1), frame (1), frame (1.8), frame (2), frame (2.2), frame (3), frame (3), frame (3.8), and frame (4). For example, seven frames of frame (0) to frame (2.2) correspond to the left and right frames 2 to 8 in FIGS. 5 and 6, respectively.

As described above, the output controller 204 appropriately selects an input frame and a motion vector needed for generating an interpolation frame and outputs control signals for inputting the input frame and the motion vector to the output image generator 206. At the same time, the output controller 204 outputs the interpolation phase control signal 107 to the output image generator 206. The output image generator 206 generates an interpolation frame in the interpolation phase designated by the interpolation phase control signal 107 using two frames input as the previous and next frame video signal 105, and the motion vector 106 for interpolation corresponding to the motion between the two frames, and outputs the output video signal 103.

Figure 4:
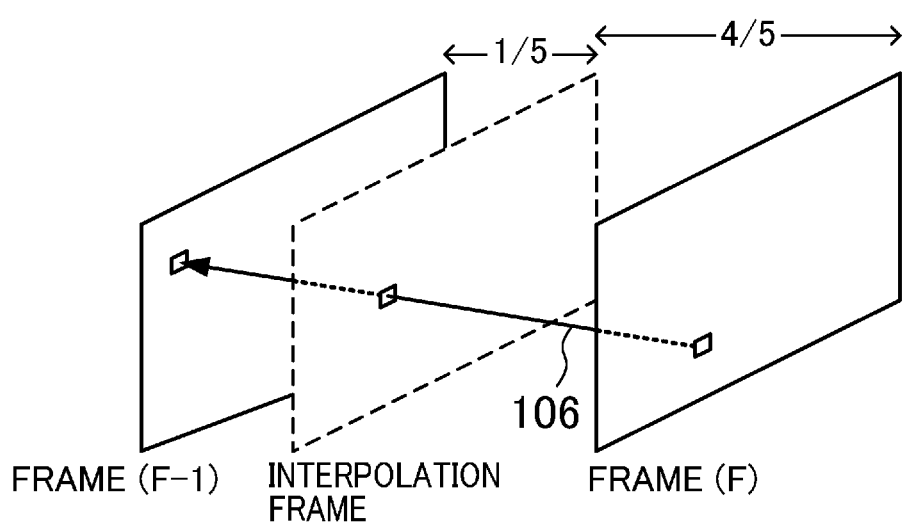
FIG. 4 illustrates an exemplary interpolation frame.

FIG. 4 illustrates an exemplary interpolation frame. As shown, the interpolation frame can be generated by moving pixels or a pixel block of at least one of the previous and next frames of the generated interpolation frame along the motion vector 106 for interpolation. At this time, the position on the time axis in which the interpolation frame is generated, i.e., the interpolation phase, can be selected between frame (F−1) and frame (F). For example, the interpolation frame may be generated using the pixels moved from only one of the frames such as the frame closer to the interpolation phase. Alternatively, the interpolation frame may be generated by mixing the pixels moved from both of the frames at a predetermined ratio or a ratio corresponding to the interpolation phase. In the example shown in FIG. 4, the interpolation frame is generated in an interpolation phase of ⅕ from frame (F−1).

Figure 5:
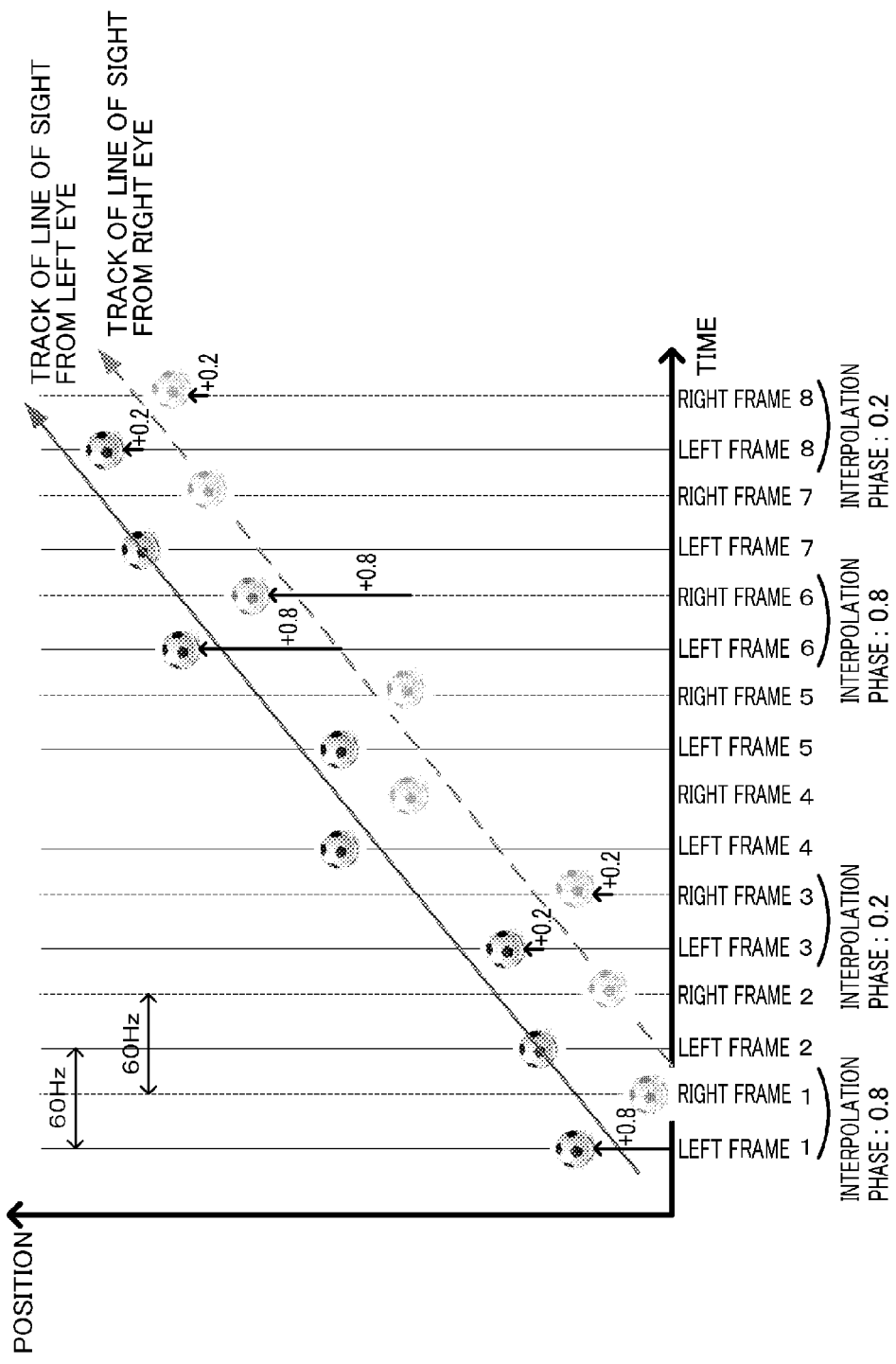
FIG. 5 illustrates the appearance of a stereoscopic video image created by a film dejudder of the stereoscopic video display system shown in FIG. 1.

FIG. 5 illustrates the appearance of a stereoscopic video image created by film dejudder by the stereoscopic video display system 100 shown in FIG. 1. Specifically, FIG. 5 illustrates the relationship between time and the display position of a ball, where the right and left video images of the scene of FIG. 7 are filmed in 3D at 24 Hz and displayed by the stereoscopic video display system 100.

Figure 6:
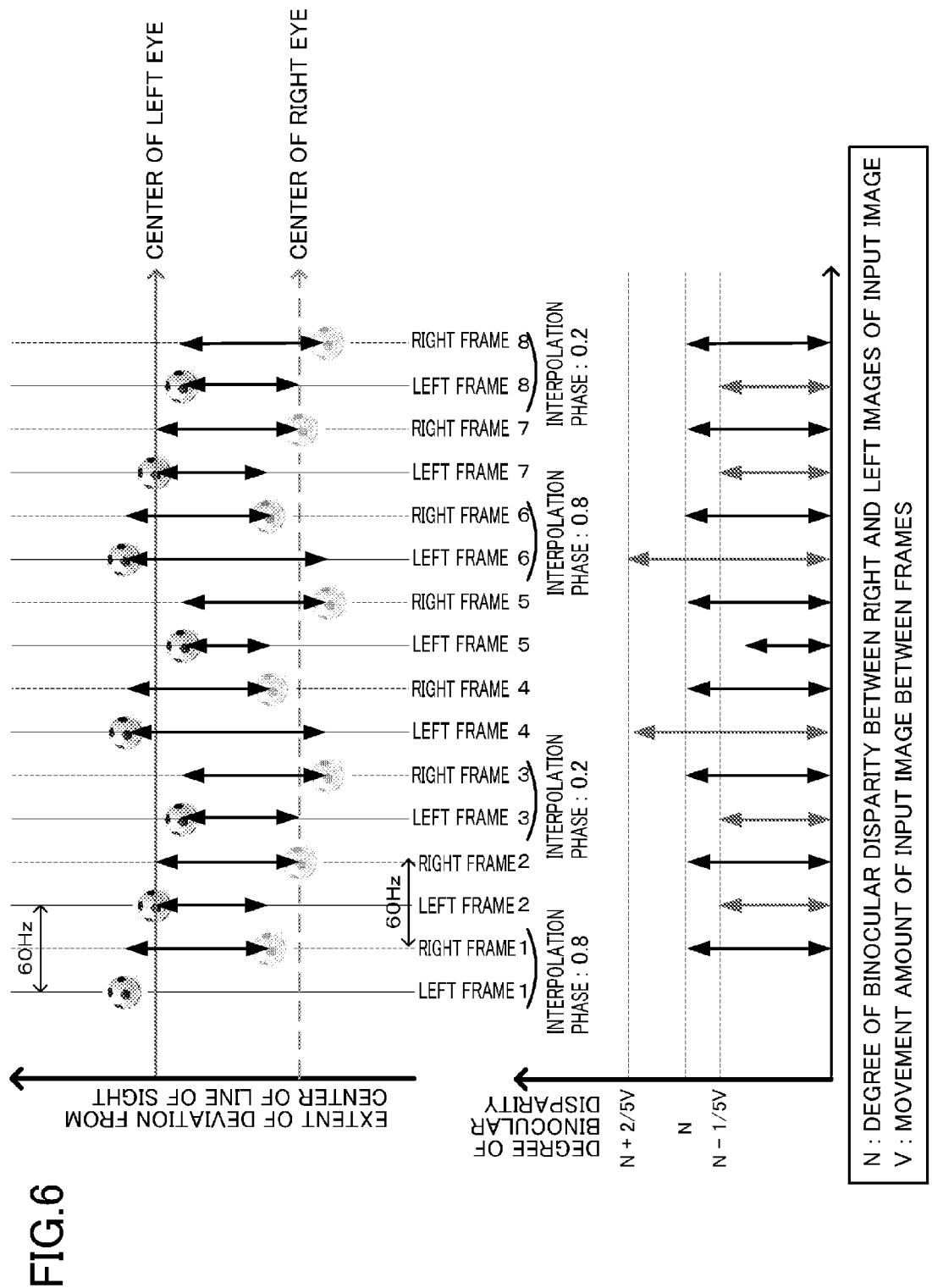
FIG. 6 illustrates the degree of binocular disparity of a stereoscopic video image created by a film dejudder of the stereoscopic video display system shown in FIG. 1.
Figure 10:
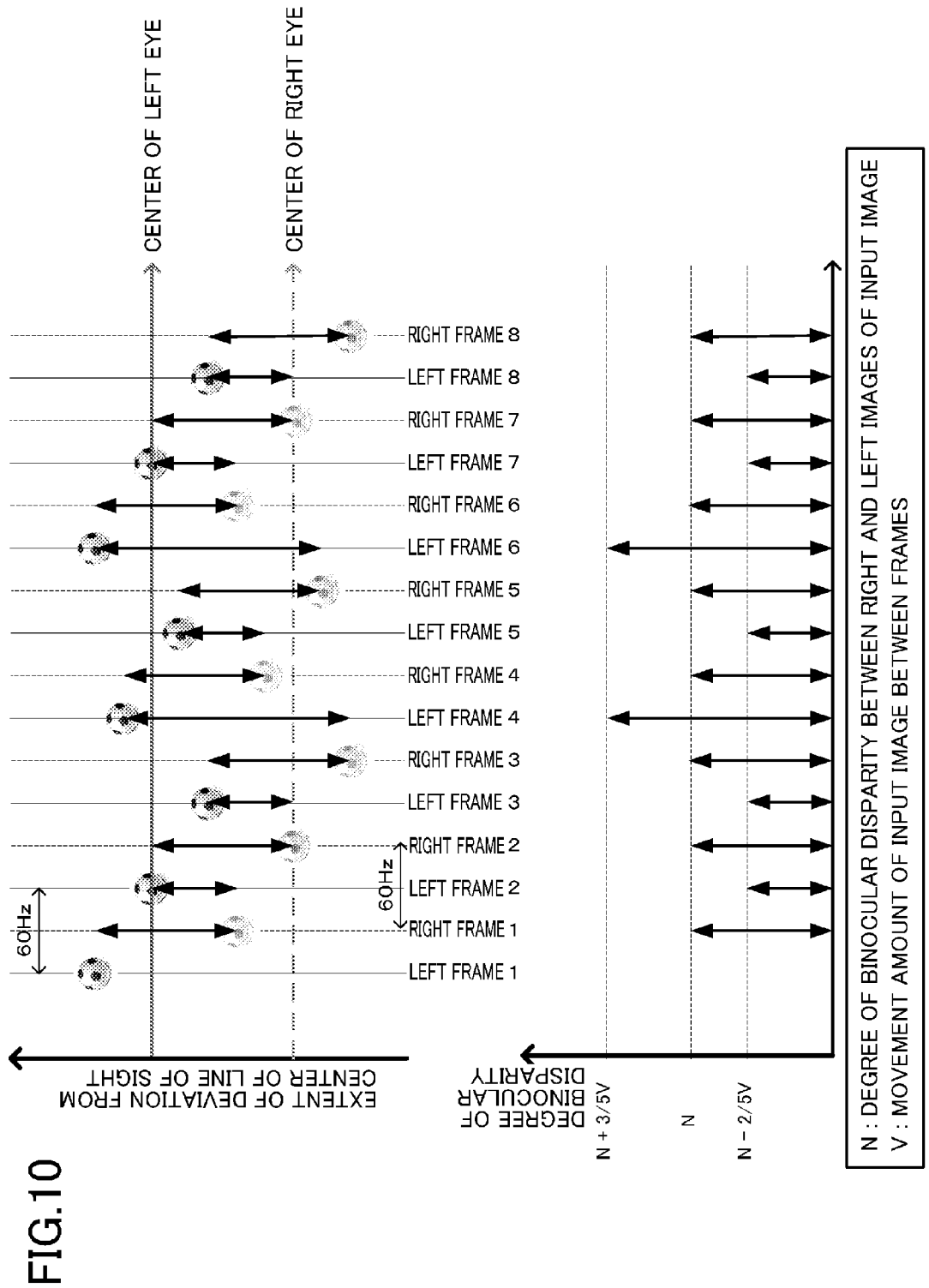
FIG. 10 illustrates the degree of binocular disparity of a stereoscopic video image created by 3:2 pull-down.

FIG. 6 illustrates the degree of binocular disparity of a stereoscopic video image created by a film dejudder of the stereoscopic video display system 100 shown in FIG. 1. The binocular disparity is caused by deviation of the display position of the ball from the centers of the lines of sight from right and left eyes. In FIG. 6, the degree of the binocular disparity between the right and left images of the input image is N, and the movement amount of the input image between frames is V. The degree of the binocular disparity of the output image fluctuates in a range between N−⅕ V and N+⅖ V among the numerous frames. As compared to FIG. 10, it is found that with respect to the stereoscopic video image displayed by the stereoscopic video display system 100 shown in FIG. 1, the fluctuations of the degree of the binocular disparity are reduced. As a result, the stereoscopic video display system 100 can achieve high quality stereoscopic display. This is because the stereoscopic video display system 100 can generate and output interpolation frames for the input frames having a great influence on the binocular disparity and not for the remaining input frames.

Specifically, referring again to FIGS. 5 and 11, the stereoscopic video display system 100 of the instant application can control the interpolation phases so that two of five frames are the generated interpolation frames. In contrast, in the stereoscopic video display system of H09-172618 four of five frames are the generated interpolation frames in frame frequency conversion from 24 Hz to 60 Hz. As described above, the ratio of the interpolation frames, which are contained in the output video signal and generated using the motion vectors, influences the degree of deterioration in the image quality if an incorrect motion vector is detected. Thus, the stereoscopic video display system 100 of the instant application can reduce the deterioration in the image quality during the frame frequency conversion, as compared to the stereoscopic video display system of H09-172618. Furthermore, in the stereoscopic video display system 100 of the instant application, since the number of the generated interpolation frames is half, the amount of processing needed for generating the interpolation frames can be reduced (e.g., halved) as compared to the amount of processing needed for generating the interpolation frames in the stereoscopic video display system of H09-172618.

Furthermore, the stereoscopic video display system 100 of the instant application may generate interpolation frames with phases 0.2 and 0.8. As described above, where the interpolation phase for generating an interpolation frame is close to the input frame, the movement amount from the input frame is small, thereby reducing the influence of an incorrect motion vector. Therefore, in the stereoscopic video display system 100 of the instant application, an incorrect motion vector has a relatively small influence on the image quality as compared to the stereoscopic video display system of H09-172618 using interpolation phases of 0.4 and 0.6.

To this end, in the stereoscopic video display system 100 of the instant application, the ratio of the interpolation frames is low and the interpolation phases close to the input frame are used. As a result, the image quality can be less deteriorated even if an incorrect motion vector is detected. Therefore, the stereoscopic video display system 100 of the instant application enables high quality stereoscopic display and reduces deterioration in the image quality caused by an interpolation error.

Other implementations are contemplated. For example, in the above-described implementations, the interpolation frames may be generated and output for the frames having a great influence on the binocular disparity. In another implementation, however, the binocular disparity between the right and left images of the input image may be detected.

Then, the degree of the binocular disparity between the right and left images where the image is displayed after 3:2 pull-down may be calculated based on the binocular disparity and the magnitude of the motion vector. If the degree of the binocular disparity is out of the predetermined range, an interpolation frame may be generated. The interpolation frame may enable high quality stereoscopic display of an image having large apparent binocular disparity. Furthermore, in this implementation, since the ratio of interpolation frames to displayed frames is low, deterioration in the image quality caused by an interpolation error can be reduced.

For another example, while in the above-described implementations, the generation of an interpolation image is determined on a frame-by-frame basis, the generation of an interpolation image may be determined on an image region-by-image region basis in a frame. The size of an image region may be equal to or different from the size of a block used for detecting a motion vector. For example, when an object crosses a motionless screen, an interpolation image may be generated for only an image region including a moving object. This implementation may allow for a high quality stereoscopic display by generating the interpolation image for the image region including the moving object. On the other hand, since the ratio of the interpolation images to the output images is low, deterioration in the image quality caused by an interpolation error can be reduced.

For another example, while in the above-described implementations, an example has been described where the stereoscopic video signal 101 of 24 Hz is input, the stereoscopic video signal 101 may be a stereoscopic video signal of 60 Hz obtained by 3:2 pull-down. If a stereoscopic video signal of 24 Hz before performing 3:2 pull-down is appropriately selected from a stereoscopic video signal of 60 Hz obtained by the 3:2 pull-down, similar processing can be performed.

The timing relationship among the signals shown in FIG. 3 is merely an example. Depending on the capacity of the video memory 202 and the vector memory 205, processing can be performed at different timing. The interpolation phases of the interpolation frames to be generated are not limited to 0.2 and 0.8. The phases may be close to these values. For example, the phases may be 0.19 and 0.81.

Furthermore, the output controller 204 may not immediately generate the interpolation frames shifted by a 0.2 or 0.8 frame. In one specific example, the output controller 204 gradually changes the value of the interpolation phase control signal 107. To this end, the output controller 204 gradually sets the interpolation phases of the interpolation frames to 0.2 or 0.8 or close to 0.2 or 0.8 where it is determined that motion occurs between the frames. Similarly, when generation of an interpolation frame is stopped, the output controller 206 gradually sets the interpolation phase of the interpolation frames to 0 or close to 0. As a result, display with an interpolation frame and display without an interpolation frame are smoothly switched, thereby improving the image quality.

Furthermore, the video memory 202 and the vector memory 205 may not be necessarily provided in the stereoscopic video processing system 2. Instead, external memories may be used. Furthermore, while in the above-described implementations, the stereoscopic video processing system 2 includes the two frame frequency converters 20, the stereoscopic video processing system 2 may time-share a single frame frequency converter 20 including the vector detector, the output image generator, and the output controller to process a right input video signal and a left input video signal.

Other implementations are contemplated.

What is claimed is:

1. A stereoscopic video processing system comprising:
    a right frame frequency converter for processing a right input video signal; and
    a left frame frequency converter for processing a left input video signal, wherein:
    the right frame frequency converter includes:
        a right vector detector configured to detect a right motion vector associated with frames of the right input video signal;
        a right output image generator configured to generate a right output video signal by generating right interpolation frames based on the frames of the right input video signal and the right motion vector and arranging the frames of the right input video signal and the right interpolation frame along a time axis; and
        a right output controller configured to control the right output image generator to output the right interpolation frames as the right output video signal alternately at intervals of one frame and two frames and output the frames of the right input video signal as the right output video signal between the right interpolation frames, and
    the left frame frequency converter includes:
        a left vector detector configured to detect a left motion vector associated with frames of the left input video signal;
        a left output image generator configured to generate a left output video signal by generating left interpolation frames based on the frames of the left input video signal and the left motion vector and arranging the frames of the left input video signal and the left interpolation frame along a time axis; and
        a left output controller configured to control the left output image generator to output the left interpolation frames as the left output video signal alternately at intervals of one frame or two frames of the left input video signal and output the frames of the left input video signal as the left output video signal between the left interpolation frames.

2. The stereoscopic video processing system of claim 1, wherein:
    the right output image generator is configured to generate each of the right interpolation frames in a phase which divides time between two of the frames of the right input video signal into a ratio of 1:4, and
    the left output image generator is configured to generate each of the left interpolation frames in a phase which divides time between two of the frames of the left input video signal into a ratio of 1:4.

3. The stereoscopic video processing system of claim 1, wherein:
the right vector detector is configured to detect a motion vector of each block on each of the frames of the right input video signal, and
the left vector detector is configured to detect a motion vector of each block on each of the frames of the left input video signal.

4. A stereoscopic video display system comprising:
an input image selector configured to receive a stereoscopic video signal, and output a right input video signal and a left input video signal, each having a frame frequency of 24 Hz;
the stereoscopic video processing system of claim 1 configured to process the right and left input video signals; and
a display configured to perform frame sequential display of a right output video signal and a left output video signal, each having a frame frequency of 60 Hz, output from the stereoscopic video processing system of claim 1.

5. A stereoscopic video processing method comprising steps of:
detecting a first motion vector associated with frames of a right input video signal and a second motion vector associated with frames of a left input video signal;
generating right interpolation frames based on the frames of the right input video signal and the first motion vector and generating left interpolation frames based on the frames of the left input video signal and the second motion vector; and
outputting the right interpolation frames as a right output video signal alternately at intervals of one frame and two frames of the right input video signal, and outputting the left interpolation frames as a left output video signal alternately at intervals of one frame and two frames of the left input video signal, and
outputting the frames of the right input video signal as the right output video signal between the interpolation frames, and outputting the frames of the left input video signal as the left output video signal between the interpolation frames.

6. The stereoscopic video processing method of claim 5, wherein in generating the right and left interpolation frames, each of the right interpolation frames is generated in a phase which divides time between two of the frames of the right input video signal into a ratio of 1:4 and each of the left interpolation frames is generated in a phase which divides time between two of the frames of the left input video signal into a ratio of 1:4.

7. The stereoscopic video processing method of claim 5, wherein detecting the motion vector includes detecting a motion vector of each block on each of frames of the right input video signal and the left input video signal.

* * * * *